Figures 1, 2:
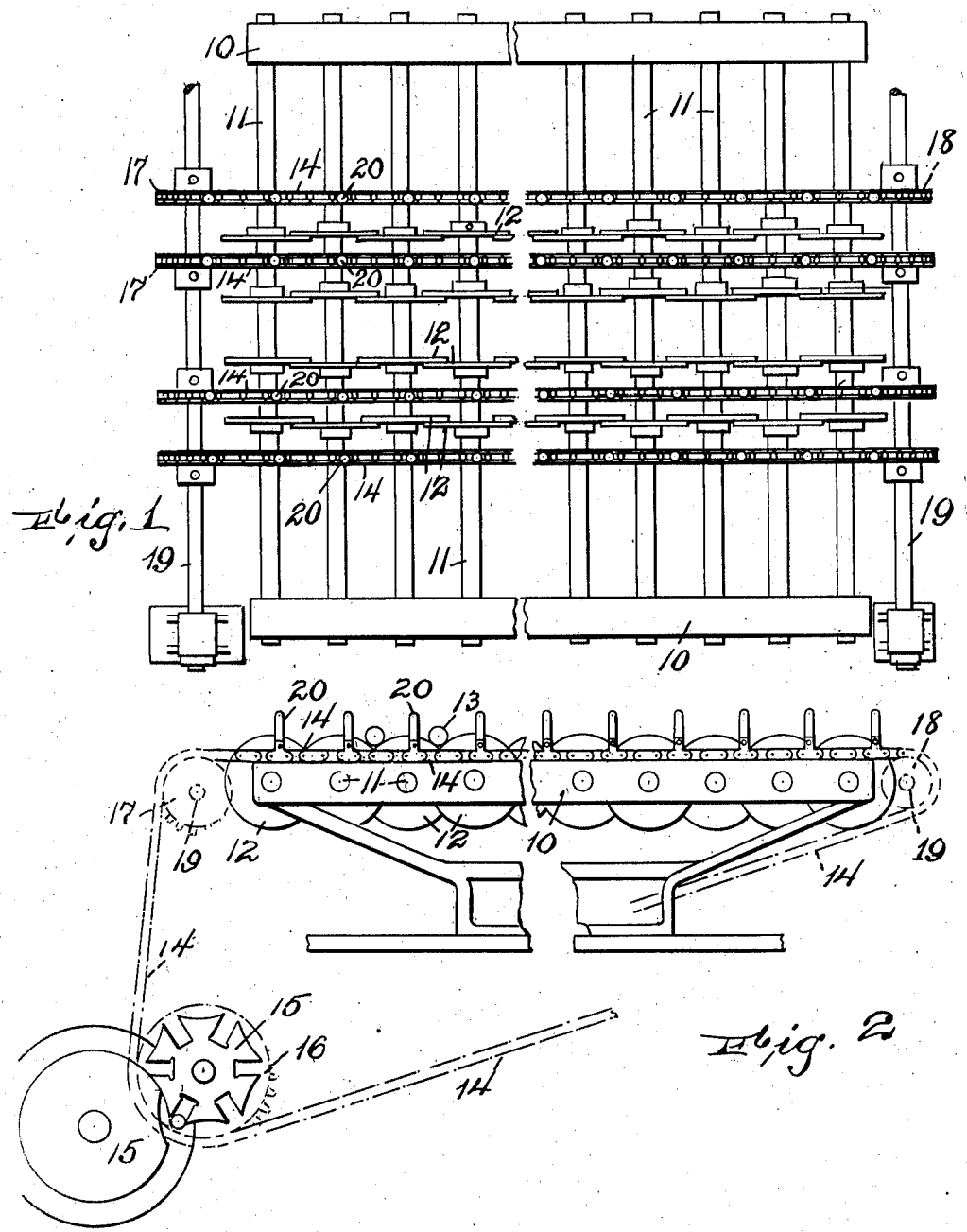

March 16, 1943.   C. EISLER   2,313,814
CONVEYER FOR GLASS VIALS
Filed Sept. 16, 1941

INVENTOR
Charles Eisler,
BY
Wm H Canfield.
ATTORNEY.

Patented Mar. 16, 1943

2,313,814

UNITED STATES PATENT OFFICE 2,313,814

CONVEYER FOR GLASS VIALS

Charles Eisler, South Orange, N. J.

Application September 16, 1941, Serial No. 410,966

2 Claims. (Cl. 198—135)

This invention relates to part of a machine for forming glass vials. The machine is of the type that conveys a tube or blank of glass in the path of flames from a burner and at a pre-determined point where the glass is sufficiently softened the ends are slightly separated and the severed ends are further advanced while still subject to flame and rotated to cause the flame to seal the end and thus form a bottom for the end. The product is a glass vial.

The present invention is designed to insure the steady advance of a glass tube by a step-by-step movement, engaging the tube at separated points in order to keep the ends aligned during and after separation which insures sealed ends that are flat, or evenly rounded if subjected to frictional engagement with a die or shaper. The invention is economical in operation as the support of the tubes in the form of overlapping discs or wheels are freely rotatable and move under the influence of the tube which in turn is positively advanced by the step-by-step mechanism previously referred to.

The drawing accompanying this specification illustrates part of the machine sufficient for an understanding of the invention but omitting parts that are no part of this invention.

In the drawing Figure 1 is a top view of part of a machine illustrating the mechanisms that support and propel the tubes. Figure 2 is a side view of the machine illustrated in Figure 1. Both figures are broken away to show that the machine is shortened, in the drawing, as the commercial machines are considerably longer than the one shown in the drawing.

The machine comprises side frames 10 which extend along both sides and rest on any desired form of base. The side frames act to support the shafts 11 which extend from side to side and rotate freely in bearings in the side frames. The shafts support wheels or discs 12 which overlap to an extent that provide seats for the glass tubes 13 and hold them well above the level of the top surface of the side frames. The discs are arranged in rows in order to support the glass tubes at several places on each side of the center of the tube, as will be evident to any one skilled in the art. The glass tubes come to rest momentarily in the seats and are progressed "intermittently" as they proceed. The glass tubes are subjected to flame from burners which are not shown and are in common use in machines of this type. When the tubes are heated to a high enough temperature the two ends are separated by any of the well-known devices and are continued in the path of flame from burners until the glass in the rotated tube ends closes the ends of the tubes and thus form a vial from each half or end of a tube.

In this form of manufacture of vials it is necessary to advance the tubes regularly and easily and the freely rotatable discs allow the easy passage of the tubes from one seat to the next. In order to keep the tubes from unequal strain and to push them forward in parallel relation they are engaged by means other than the discs.

The means comprises a set of parallel chains 14 which are arranged between the rows of discs and are advanced in unison. The advance is step-by-step and the form shown comprises a Geneva movement 15 which operates driving sprockets 16 over which the chains 14 pass. The chains pass over sprockets 17 and 18 at the ends of the frame which sprockets are fixed on the shafts 19.

The chains are provided with projections such as the small posts or pins 20 which posts are separated or spaced equally and to the same extent as the shafts 11. As the chains are advanced they cause the tubes 13 to be engaged at the same time at separated points and pass along over a set of discs 12 to the next set of discs. The freely rotatable discs offer no appreciable resistance to the movement of the tubes. The machine is adapted for handling various sizes of tubes.

I claim:

1. In a machine of the character described, means for supporting glass tubes, said means comprising freely rotatable disks which discs are mounted so that they overlap and form seats for glass tubes, chains movable parallel to said discs and including projections which are aligned to engage a glass tube simultaneously at separated points and pass the tube from one seat to the next, and means for propelling the chains by a step-by-step movement.

2. In a machine of the character described, means for supporting glass tubes, said means comprising freely rotatable overlapping wheels arranged in parallel series for supporting glass tubes, in seats formed at the juncture of the overlapping wheels, chains arranged between the rows of wheels and including aligned projections for engaging a glass tube at separated points and advancing the tube to the next succeeding seat, and means for propelling the chains in unison and by a step-by-step movement.

CHARLES EISLER.